(No Model.)

A. GUMMER.
VEHICLE SPRING.

No. 461,016. Patented Oct. 13, 1891.

Witnesses:
Burton V. Gummer
Thomas B. Blackburn

Inventor:
Albert Gummer

UNITED STATES PATENT OFFICE.

ALBERT GUMMER, OF OMRO, WISCONSIN.

VEHICLE-SPRING.

SPECIFICATION forming part of Letters Patent No. 461,016, dated October 13, 1891.

Application filed March 28, 1891. Serial No. 386,881. (No model.)

*To all whom it may concern:*

Be it known that I, ALBERT GUMMER, a citizen of the United States, residing at Omro, in the county of Winnebago and State of Wisconsin, have invented a new and useful Improvement in Vehicle-Springs, of which the following is a specification.

My invention relates to an improvement in a class of vehicle-springs pivoted to the forward end of a vehicle-body; and it consists in forming the pivot and bearing at a point between the upper and lower leaves of the spring and on each side of the same in connection with a curved lug and corresponding bolt working directly under the lug and extending across the under side of the spring, the bolt serving to couple the several parts of the specified device together, as hereinafter more fully described.

Figure 1:
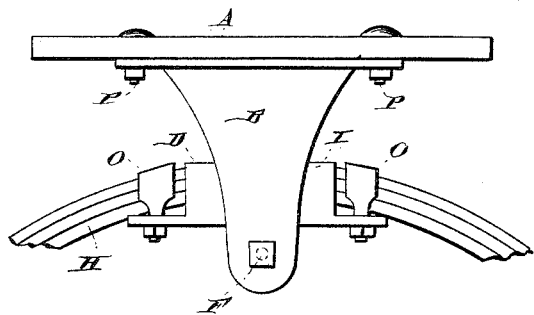
Figure 2:
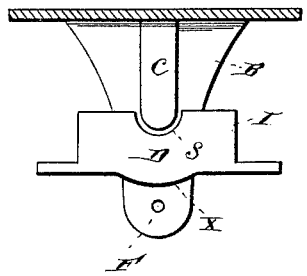
Figure 3:
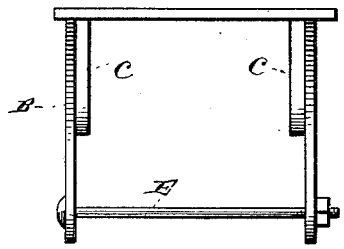

Figure 1 is a front elevation. Fig. 2 is an inside view; Fig. 3, a transverse view of the same, and Fig. 4 is an end view of the box coupled to the spring.

H represents a section of the upper half of an elliptic spring, and A the front end of a vehicle-body, to which the box B is secured by the bolts P. The box B is made with a bottom and two sides, and between the latter the spring H works.

Figure 4:
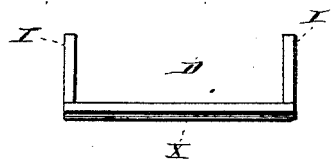

D is an inner box secured to the under part of the spring H, and it possesses two sides or flanges I, Fig. 4, between which the spring H is fastened by the clip-bolts O, and the flanges I contain a semicircular seat S, wherein the supplemental strips C, constituting a part of the box B, rest and work in sympathy with the surface of the road over which the vehicle travels. The strips C extend in part down the inner sides of the box B and form thereby the shoulder and pivot supporting the body A upon the spring H, and the latter and the body A are held to each other by the bolt E passing through the hole F, and the sides of the box B, and which bolt is allowed to work to and fro directly under the curvature or lug X in the bottom of the box D.

Although the bolt E is shown as passing through each side of the box B to couple the spring and vehicle-body together, the same thing is attained by a bolt fastened to one side only, with this difference, that said bolt in the latter way does not couple the two sides of the box B together, which fact perhaps might render the shorter bolt the least preferable.

Having described my invention, I claim—

The combination, with a vehicle-spring, of a spring-box D, having seats S and curved lug X, box B, provided with strips C for engagement with said seats, and a stay-bolt E, substantially as shown and described.

ALBERT GUMMER.

Witnesses:
BURTON V. GUMMER,
JULIEAN D. WILES.